United States Patent [19]

Ariessohn

[11] Patent Number: 4,759,033
[45] Date of Patent: Jul. 19, 1988

[54] TEMPERATURE MEASUREMENT OF HOT MINERAL PRODUCT BY INDUCED FLUORESCENCE

[75] Inventor: Peter C. Ariessohn, Sumner, Wash.

[73] Assignee: Weyerhaeuser Company, Tacoma, Wash.

[21] Appl. No.: 68,474

[22] Filed: Jul. 1, 1987

[51] Int. Cl.$^4$ ........................ G01K 11/20; F27D 21/00
[52] U.S. Cl. ................................. 374/161; 250/458.1; 432/32; 432/103
[58] Field of Search ............... 374/121, 127, 159, 161, 374/162, 149, 139, 140, 137; 250/458.1; 432/32, 37, 49, 103

[56] References Cited

U.S. PATENT DOCUMENTS

| | | | |
|---|---|---|---|
| 2,116,450 | 5/1938 | Richardson et al. | 374/121 |
| 3,331,247 | 7/1967 | Toepell | 374/137 |
| 3,544,710 | 12/1970 | Poos | 374/137 |
| 3,556,496 | 1/1971 | Hucke | 432/32 |
| 3,595,544 | 7/1971 | Curtis et al. | 432/32 |
| 3,647,195 | 3/1972 | Drewry | 432/49 |
| 3,871,212 | 3/1975 | Neugroschl | 374/162 |
| 3,888,621 | 6/1975 | Williams | 432/103 |
| 4,397,569 | 8/1983 | Davis | 374/137 |
| 4,408,903 | 10/1983 | Baldasarri | 374/121 |
| 4,463,437 | 7/1984 | Schneck et al. | 374/137 |
| 4,487,575 | 12/1984 | Jager et al. | 431/1 |
| 4,539,588 | 9/1985 | Ariessohn et al. | 374/127 |
| 4,542,987 | 9/1985 | Hirshfeld | 356/44 |

FOREIGN PATENT DOCUMENTS

| | | | |
|---|---|---|---|
| 1019987 | 11/1977 | Canada | 244/13 |
| 60-250640 | 12/1985 | Japan . | |
| 2064107B | 12/1983 | United Kingdom | 280/169 |
| 2113837 | 4/1986 | United Kingdom | 160/281 |

OTHER PUBLICATIONS

Alves, R. V. et al., Fluoroptic Thermometry: Temperature Sensing Using Optical Fibers, *Advances in Instrumentation* 38 (2): Proc. I.S.A. Int'l. Conf., Houston, TX, Oct. 10–13, 1983.

Bartran, David S. and Kirby Nelson, Improved Kiln Utilization Through Noncontact Temperature Measurement, *Chem. Eng.* 92 (13): 65–66 (1985).

Cates, M. R. et al., Laser Induced Fluorescence of Europium Doped Yttrium Oxide Etc., *Laser Inst. Amer., Int'l. Cong. On Applic. of Lasers & Electro-Optics*, 49,50,51: 142–147 (1985).

Fonger, W. H. and C. W. Struck, $Eu^{+3,5}D$ Resonance Quenching to the Charge Transfer States in $Y_2O_2S$, $La_2O_2S$, and $LaOCl$, *Jour. Chem. Phys.* 52(12): 6364–6372 (1970).

(List continued on next page.)

*Primary Examiner*—William A. Cuchlinski, Jr.
*Assistant Examiner*—Thomas B. Will

[57] ABSTRACT

The present invention is a method of measuring the temperature of a hot crystalline material. It is especially well adapted for measuring the temperature of mineral products within or being discharged from rotary or other types of kilns. The mineral material entering the kiln is doped with a rare earth compound at a level of at least 0.001 molar percent, preferably about 0.01 molar percent. During the process of calcination in the kiln, the rare earth is incorporated into the crystal lattice of the host mineral to form a phosphor. This is excited by laser light of an appropriate wavelength. The flourescence emitted by the excited hot material is then measured and can be accurately related to the temperature. In one version of the invention the mineral material is used in a chemical process where it is recycled to the kiln for recovery. The lime cycle in a kraft pulping operation is such a process. In this way there is minimal loss of the rare earth material and all that need be added is a sufficient amount to make up process losses. Under such operating conditions the cost is minimum and is minor when compared to the potential savings in fuel by avoiding overburning. However, the amounts of rare earth dopant used are sufficiently small so that the process can be used with other calcined materials, such as cement, which are not recycled through the process. Praseodymium is a preferred dopant for use with lime kilns.

14 Claims, 4 Drawing Sheets

OTHER PUBLICATIONS

Hughes, A. E. and G. P. Pells, Fluorescence Spectra of $Gd^{3+}$ Ions in CaO, *Jour. Phys. C.: Solid State Phys.* 7: 3397–4006.

Khare, R. P. and J. D. Ranade, Fluorescence of CaO Phosphors Activated by Ce & Tb Under X-Ray Excitation, *Indian Jour. of Pure and Appl. Phys.* 13: 664–666 (1975).

Khare, R. P. and J. D. Ranade, Sensitization of $Ce^{3+}$ Luminescence by $Gd^{3+}$ in CaO, *Jour. Mat'ls Sci.—Letters* 15: 1868–1869 (1980).

Kolodner, Paul and J. A. Tyson, Remote Thermal Imaging with 0.7 μm Spatial Resolution Using Temperature Dependent Fluorescent Thin Films, *Appl. Phys. Lett.* 42 (1): 117–119 (1983).

Porter, Laura C. et al., Host Materials for Laser-Excited Fluorescence of Lanthanide Probe Ions, *Applied Spectroscopy* 37 (4): 360–371 (1983).

Porter, Laura C. and J. C. Wright, Site Selective Spectroscopy and Defect Chemistry of CaO, *Jour. Chem. Physcis* 77 (5): 2322–2329 (1982).

Wickersheim, K. A., Fiberoptic Thermometry Based on Measurement of Fluorescent Decay Time, *Jour. Microwave Power* 21: 105–106 (1986).

Wickersheim, K. A. et al., Study of Rare Earth Activated Materials for Radiation Sensing Applications, 3rd Annual Rep't., U.S. Atomic Energy Commission, Contract No. AT(04-3)-674 (1969).

Wickersheim, K. A. and R. A. Lefever, Luminescent Behavior of the Rare Earths in Yttrium Oxide and Related Hosts, *Jour. of the Electrochemical Soc.* 111 (1): 47–51.

Wickersheim, K. and Mel Sun, Phosphor and Fiber Optics Remove Doubt from Difficult Temperature Measurements, *Research and Development* 27 (11): 114–119.

TEMPERATURE MEASUREMENT OF HOT MINERAL PRODUCT BY INDUCED FLUORESCENCE

BACKGROUND OF THE INVENTION

The present invention is a method for obtaining an accurate temperature measurement of a hot mineral material. The method is particularly useful for measuring the temperature of products such as lime or cement clinker within or as they are discharged from a rotary kiln.

One key piece of information necessary for the efficient operation of a rotary kiln is the temperature of the product as it exits the kiln. A lime kiln may be considered as exemplary. If the product exit temperture is too high, then the lime is being over-burned. One characteristic of such a product is that it forms into nodules having hard shells. If used in a chemical process, this product will be less reactive than desired. A further, and perhaps even more undersirable problem with overburning is the unnecessarily excessive use of fuel. On the other hand, if the product temperature is too low, the calcium carbonate may not be fully converted to the oxide form. Once again this results in reduced reactivity and, in chemical processes such as kraft pulping liquor preparation, can result in increased deadload being carried around the cycle. A further problem with underburning is poor nodulization of the lime. This can cause severe dusting conditions in the kiln with sizable fractions of the converted lime being entrained in the flue gases. Frequently this results in precipitator overload and significant loss of lime from the stack. This condition also wastes energy and kiln capacity since the material lost as dust has undergone the normal conversion process in the kiln. Similar problems occur during manufacture of the various types of Portland cement.

On first consideration, it would seem that accurate temperature measurement of the product within or being discharged from a kiln would be a very simple problem. Unfortunately, this is not the case. The two methods normally used; i.e., thermocouples and infrared pyrometers, are both inappropriate in this environment.

Thermocouples tend to have extremely short life spans because of the high temperature environment, high chemical reactivity and abrasive character of the product, and the extreme mechanical forces imposed by occasional very large nodules. In addition, unless the thermocouple is completely immersed in the product, substantial correction for radiative heat transfer is required. Unfortunately, the magnitude and even the sign of this correction cannot be readily or accurately determined.

Optical pyrometers are in some ways even more unsatisfactory. The optical properties of lime are such that it is highly transparent to radiation of all wavelengths from the mid-ultraviolet to the mid-infrared. Therefore, in the form that exists in a kiln, lime is a very good scatterer of radiation in the range from the near ultraviolet, through the visible, and well out into the infrared and does not exhibit any appreciable absorption. It follows from this that since the absorptivity is very low the emissivity is also very low. It is likely that the temperature indicated by a pyrometer viewing the lime surface will be heavily influenced by reflected radiation which originates at the kiln wall or in the flame. In the infrared, at wavelengths longer than 15 um where lime does show significant absorption, the absorption of radiation by water vapor and carbon dioxide will produce an additional substantial interference. Actual temperature measurements of the lime itself, when obtained by pyrometer, are likely to be substantially in error. This is especially unfortunate since the advantages of optical measurement are considerable. They can be nonintrusive, continuous, and can be made on-line without the need for physically sampling the material being measured.

In recent years a number of laser-based measurement techniques have been developed for measuring temperature, composition, velocities and other characteristics of matter in extremely harsh environments. In these techniques, the interaction of the laser radiation with the material under study is examined to determined some property of the material. Laser-induced fluorescence has been employed for temperature measurement although it has never been suggested for use in the hostile environment of an industrial kiln operation. In fact, a number of significant potential impediments immediately come to mind with regard to the use of this technique for kiln product measurement. To better understand these impediments, and how they have been overcome in the present invention, it is necessary to briefly describe the use of laser-induced fluorescence for temperature measurement.

Fluorescence is a property of certain materials whose electrons cna readily undergo transitions between higher and lower energy states. The higher energy state is usually brought about by excitation by light in a given spectral range, by x-rays, or by electron beam irradiation. When the source of excitation is removed, the electrons return to their lower energy state and emit light having a spectral distribution characteristic of the particular material. Phosphors, as these fluorescent materials are called, are commonly used as a coating on the screen portion of cathode ray tubes and on the interior surface of fluorescent lights, as well as for many other purposes. Without phosphors having various spectral emission characteristics color television, or for that matter black-and-white television in its current form, would be impossible.

Phospors are usually crystalline, inorganic materials which are "doped" with small amounts of an impurity which enters the crystal lattice. In most cases the host material itself shows little or no fluorescence or a fluorescence which is in an undesirable spectral range. Over the last two decades rare earth dopants have come into wide use in the preparation of phosphors. There are a number of reasons for this. Rare earths produce highly efficient phosphors—ones which fluoresce strongly. Also, the fluorescence spectra of rare earth doped phosphors generally exhibit emissions in discrete narrow bands. Selected phosphors; e.g., those used in color television tubes, show brilliant fluorescence as reds, greens and blues in the visible light range. Other fluorescence bands may be completely outside the visible light range, either in the infrared or ultraviolet.

The general knowledge that rare earth doped phosphors can be useful in instrumentation is well reported in the literature. Wickersheim et al, "Study of Rare Earth Activated Materials for Radiation-sensing Applications," 3rd Annual Report, Lockheed Missiles & Space Company, U.S. Atomic Energy Commission, Division of Biology and Medicine, Contract No. AT(04-3)-674 (1969), report the usefulness of rare earth doped phosphors in scintillation counters, x-ray conversion and image intensifier use, neutron detection, and radiation dosimetry. Hughes and Pells, *J. Phys. C.: Solid State Phys.* 7: 3997–4006 (1974), show that gadolinium doped calcium oxide spectra show a temperature dependency between 6° and 300°K. Kolodner and Tyson, *Appl. Phys. Lett.* 42(1): 117–119 (1983), teach that a thin fluorescent film may be coated on a thin conductive film which is subsequently heated by an electric current. Localized temperatures are determined to a high degree of accuracy using apparatus equivalent to a fluorescence microscope. The technique is said to be particularly useful for looking at surface temperature profiles on integrated circuit chips. Another article in the same field by Wickersheim and Sun, *Research and Development,* 27(11): 114–119 (1985), describes problems of surface temperature measurement in integrated circuit manufacturing using an optical fiber system.

Japanese Kokai No. 60[1985]-250640 teaches temperature measurement of a localized area on an integrated circuit chip surface by focusing a collimated laser beam to a small point and analyzing fluorescence.

Alves et al, *Advances in instrumentation* 38(2): 925–932 [Proc. Inst. Soc. Am. Int'l. Conf., Oct. 10–13, 1983, Houston, Tex.](1983), describe fluorescence thermometry using ultraviolet light activated phosphors with an optical fiber system.

Hirschfeld, in U.S. Pat. No. 4,542,987, describes temperature measurement using a fluorescent solid attached to one end of an optical fiber. A light source and fluorescence measuring equipment are attached to the other end of the fiber. In this case the fluorescent solid must be a single crystal or piece of a doped glass. British Patent No. 2,113,837 shows an optic fiber measuring device in which a fluorescent surface is excited by a pulsed radiation source and the decay time is measured as an indicator of temperature.

Wickersheim, *J. Microwave Power & Electromag. Energy,* 21:105–109 (1986), describes commercially available equipment for fluorescence thermometry. Two techniques are used. In one, the intensity ratio of fluorescence peaks at two different wavelengths is found to be dependent upon temperature. An alternate system uses fluorescence decay time after the phosphor is activated by a xenon flash lamp.

British Patent No. 2,064,107 describes the measurement of "a physical property" on which the fluorescent properties of a phosphor are dependent by measuring the fluorescent lifetime after being excited by a pulsed or modulated light source. Temperature is one physcial property that can be determined. The inventor describes a phosphor as being any compound which emits fluorescent radiation as a result of being irradiated with a different (shorter) wavelength energy source.

Cates et al, Laser Inst. Amer., Int'l. Conf. on Applic. of Lasers and Electro-Optics 49, 50, 51: 142–147 (1985), show the decay time versus temperature of a europium doped yttrium oxide phosphor over a temperature range of 300°–1000° C. The authors extrapolate their data and predict a usefulness of their system to 1400° C. with this phosphor. The phosphor is suggested for use as a refractory coating on rotating turbine components in order to measure surface temperatures under operating conditions.

Canadian Patent No. 1,019,978 teaches the measurement of surface temperatures of moving bodies; e.g., turbine rotors. A phosphor strip is applied to the rotating body. The activator source is preferably ultravoilet light with the emitted light being in the visible range. Fiber optics are preferably used for light transmission.

Khare and Ranade, *Indiam Jour. Pure & Appl. Phys.* 13: 664–666 (1975), show that calcium oxide forms a phosphor using cerium and terbium activators by firing mixtures of the activators with lime at 1100° C. The same authors in *Jour. of Materials Sci.* 15: 1868–1869 (1980) describe the use of calcium oxide as a host lattice for phosphors sensitized by cerium or gadolinium. These were prepared by firing calcium carbonate and the desired amount of a cerium or gadolinium compound for about four hours at 1000° C. Dopant was used at a dosage of about 0.4 mole percent based on lime. Porter et al, *Applied Spectroscopy* 37(4): 360–371 (1983), show calcium oxide to be a good matrix for rare earth phosphors, which have little interference for lanthanide analyses. Porter and Wright, *J. Chem. Phys.* 77(5): 2322–2329 (1982), teach the preparation of doped calcium oxide materials prepared from extremely pure calcium carbonate and dopant by sintering at 1150° C. for 6–48 hours.

Along the lines of more conventional kiln temperature mesurement, Bartran and Nelson, *Chem. Eng.* 92(13): 65–66 (1985), teach the modification of a kiln by the insertion of radial tubes through the kiln walls to provide wells for conventional thermocouples.

Two United States patents may be taken as representative of prior methods which attempted to measure the temperature of contents within a kiln. Drewry, in U.S. Pat. No. 3,647,195, describes the use of two internally located optical pyrometers whose output is transmitted through slip rings mounted around the outside of the kiln shell. Jager et al. in U.S. Pat. No. 4,487,575 also teach the use of infrared radiation for measurement of internal kiln conditions.

While laser-activated fluorescence is known for temperature measurement under certain conditions, it has not been heretofore used or suggested as a method for measuring the temperature of the contents in a heated kiln. There are a number of reasons why this potential use has apparently not been seriously considered heretofore. Natural minerals such as lime, which might require calcining in their processing, all contain high levels of impurities which could possibly interfere with measurements. This is in contrast to virtually all of the work just noted and to commercial rare earth phosphors which use extremely high purity host materials and rare earth dopants. Another possible reason is a perceived high cost of the rare earth dopant unless only trace quantities or crude forms would be suitable. Further, it was entirely unclear whether the residence time and temperature in a kiln would be sufficient to incorporate the rare earth into the crystal lattice of the host mineral so that a phosphor would even be formed. Also, in addition to the possible interfering spectra previously noted, some impurities are known to partially quench the fluorescence of rare earth phosphors.

Despite all of the above negative implications the present inventor has surprisingly found that calcareous and other types of minerals containing impurities can be economically doped with rare earths and that the use of fluorescence thermometry is a simple and accurate means of measuring a hot product temperature within or as it is discharged form a kiln.

SUMMARY OF THE INVENTION

The present invention is a method of measuring the temperature of a hot mineral material either within or as it is discharged from a heated kiln. It is especially well adapted for use with calcareous materials such as limestone but is expected to be further useful with other carbonate, sulfate, sulfide, or complex minerals. In the case of a calcareous mineral this may also contain an appreciable amount of argillaceous minerals. The method is especially well adapted for temperature control of lime or cement kilns.

The method is first carried out by mixing the mineral to be calcined in the kiln with a sufficient amount of a lanthanide group rare earth metal compound, in which the rare earth has an atomic number between 58 and 71. The amount of rare earth dopant added to the host mineral should normally be at least about 0.001% on a molar basis, preferably about 0.01%. The mixture of rare earth and host mineral is then heated at a sufficient temperature and for a sufficient time to convert at least the major part of the host mineral into its calcined form and incorporate the rare earth dopant into the crystal lattice of the calcined mineral to form a phosphor. Using a lime kiln as an example, retention times in the kiln of 4–5 hours at temperatures in the range of 800°–1100° C. have proved to be entirely sufficient for formation of efficient phosphors. These conditions should be considered as exemplary and not limiting.

After the crystalline phosphor is formed, it is excited with laser light energy. The exciting wavelength should be equal to or less than the wavelength of at least one of the major fluorescence peaks of the phosphor. The fluorescence emitted by the excited material is measured and this measurement is then related to the temperature of the material using a predetermined calibration curve.

The induced fluorescence may be processed either by measurement of decay time or, where at least two major spectral fluorescence peaks are present in the phosphor, by measuring the ratio of fluorescence intensity at two wavelengths.

The invention is particularly useful where the mineral originally treated with the rare earth dopant is used in a downstream process and then recycled to the kiln. In this way there is no need for further addition of the host mineral and rare earth compound other than that which is required to make up any process losses. Kraft-process pulp mills are an excellent example where the host mineral is continuously recycled. In this case, raw limestone is calcined to form calcium oxide which is used to recausticize the burned kraft liquor. In this process calcium oxide is reconverted to the carbonate. The precipitated calcium carbonate is washed free of other process chemicals and returned to the kiln where it is again calcined to calcium oxide for return to the process. Losses rarely exceed 5% during any given process cycle. In this case not only is the original host mineral preserved, but the rare earth dopant as well. Thus, it is only necessary to add a small amount of makeup limestone and rare earth compound with the majority of the material being continually recycled.

Preferred rare earth compounds within the lanthanide group are selected from praseodymium (Pr, At. No. 59), samarium (Sm, At. No. 62), europium (Eu, At. No. 63), gadolinium (Gd, At. No. 64), terbium (Tb, At. No. 65), and dysprosium (Dy, At. No. 66). Praseodymium is a preferred material because of its efficiency and cost effectiveness.

Excitation can be by any laser having sufficient power and an appropriate wavelength. A neodymium (Nd) doped YAG laser with a harmonic generator has proved to be an excellent excitation source. However, many other types of lasers are suitable. These include such types as Nd doped glass lasers, ruby lasers and many others including excimer and other pulsed gas lasers, ion lasers, metal vapor lasers, and diode lasers.

A Nd doped YAG laser has a third harmonic wavelength of about 355 nm. This is suitable for exciting all of the preferred group of rare earth metals except gadolinium. Gaolinium can be excited by the fourth harmonic of the Nd:YAG laser output at a wavelength of about 266 nm.

The equipment used for carrying out the method of the invention is essentially conventional and can be assembled from standard off-the-shelf products.

It is an object of the present invention to provide a method for measuring the temperature of a hot mineral material.

It is a further object to provide a method for temperature measurement of a hot mineral either within or as it discharged from a rotary or other type of kiln.

It is another object of the invention to provide a method for accurate temperature measurement of a hot mineral material which is not subject to major errors from kiln wall reflections and flame radiation.

It is yet another object of the invention to provide a method for measurement of temperature using a rare earth doped host mineral in which the bulk of the doped mineral is continually recycled so that process losses are minimized.

These and many other objects will become readily apparent to those skilled in the art upon reading the following detailed description taken in conjunction with the drawings.

DESCRIPTION OF THE PREFERRED EMBODIMENTS

Figure 1:
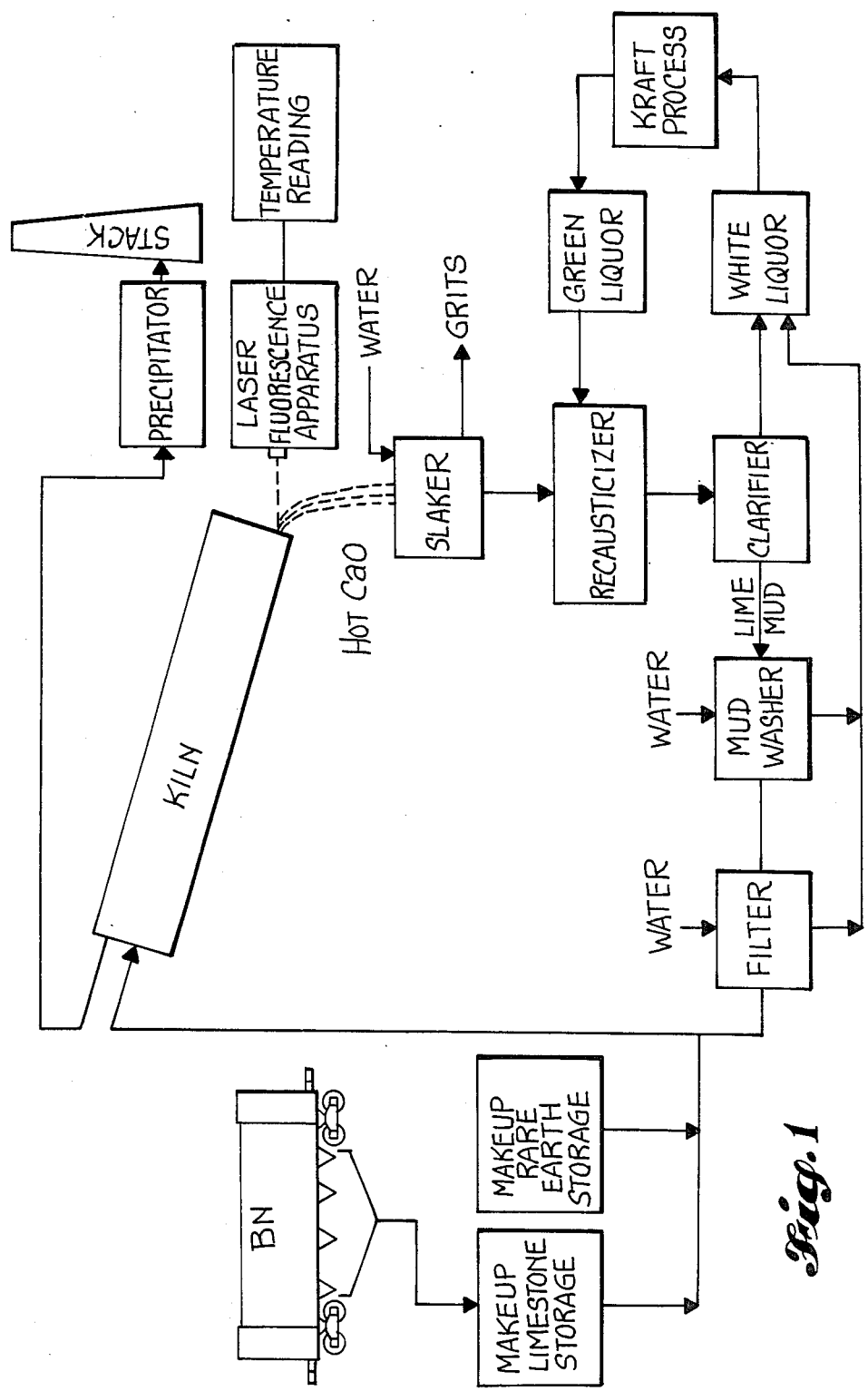
FIG. 1 is a block diagram of the lime cycle of a kraft pulping process adapted for use with the present method.

The present invention is not considered to be limited to a process in which the host mineral is recycled. It is believed to be eminently suitable for a process such as cement manufacture in which the problems of temperature measurement in the kiln are similar or identical to those present in a lime kiln. Quite surprisingly, at the low molar percentages of rare earth additive necessary to form an efficient phosphor, the economics of cement manufacture are not severely impacted. The expected saving in fuel cost exceeds the cost of the rare earth dopant and there is an anticipated significant improvement in product quality. Nevertheless, it is convenient to exemplify the process using the lime cycle from a kraft pulp mill. This is shown in FIG. 1. Three feed streams enter the rotary lime kiln. About 95 weight percent is recycled, washed lime mud from pulping liquor makeup. About 5% is makeup limestone use to offset process losses. Along with the makeup limestone a rare earth compound equivalent to about 0.01 mole percent of the makeup limestone is included. The rare earth compound may be in either a pure or crude form. As material is discharged from the kiln it is excited by a laser beam from the laser fluorescence apparatus. The fluorescence is measured and processed to give the kiln operator an accurate indication of the product temperature. If this temperature is outside of the desired range, the operator can readily make the required adjustments in the kiln fuel supply, or the adjustments can be made automatically by appropriate process control equipment.

Figure 2:
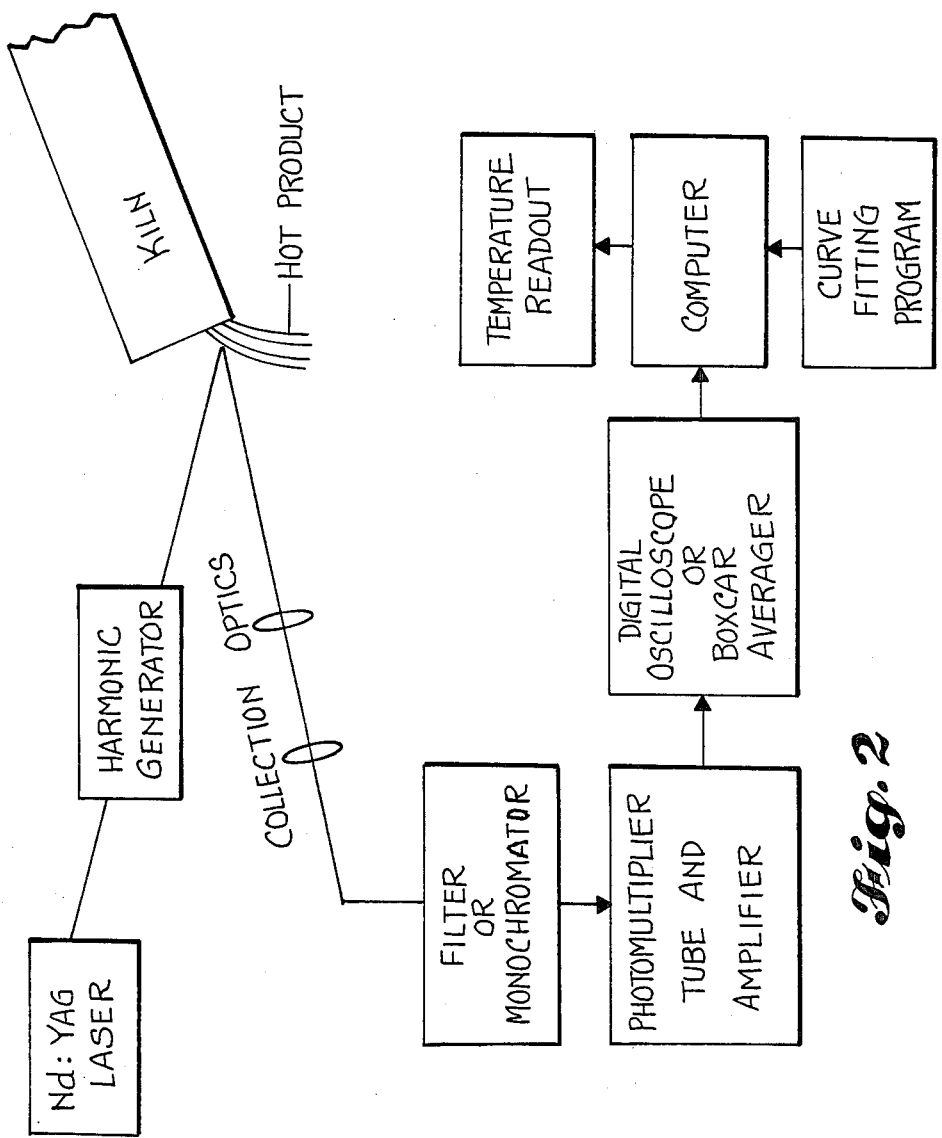
FIG. 2 is a block diagram of the major components of an apparatus suitable for use with the present method.

The laser fluorescence apparatus is shown in FIG. 2. Here a Nd doped YAG laser is used as an excitation source. The laser is used in conjunction with a harmonic generator from which the beam is impinged on the hot product being discharged from the kiln. Appropriate optics are used to collect the fluorescence which is is processed through an appropriate filter or monochromator to select the desired fluorescence wavelengths. This light is impinged on a photomultiplier tube which feeds an appropriate amplifier. From this point the signal is processed by a digital oscilloscope or a boxcar averager whose output is, in turn, fed to a computer having an appropriate resident curve fitting program. Ultimately, a temperature readout which may be visual and/or printed serves to give the necessary information to the kiln operator.

It will be understood by those skilled in the art that procedures and equipment other than that just noted will also be suitable for carrying out the method of the present invention. As one example, detectors other than photomultipliers and other types of signal processing instruments may be suitable.

One fluorescence measurement apparatus was constructed using the following items of equipment obtained from the noted vendors. This is not intended to be an endorsement of these particular vendors since entirely satisfactory alternative units are available from a number of other manufacturers in most cases. The laser employed was a Nd:YAG laser, Quanta-Ray Model DCR-2 with a Harmonic Generator Assembly Model HG-2, available from Spectra Physics, Mountain View, Calif. The monochromator was a model HR-320 from Instruments, S.A., Inc., Metuchen, N.J. The photo multiplier tube was a Hamamatsu Model R-787, available from Hamamatsu Corp. Bridgewater, N.J. This was used in a housing supplied by Products for Research, Model PR140RF-001, Danvers, Mass., using a power supply from Bertan Associates, Model 342, Hicksville, N.Y. Where a boxcar averager was used, this was supplied by Stanford Research Systems Inc., Palo Alto, Calif. This used a power supply, Model SR280, two gated integrators, Model SR250, a gate scanner, Model SR200, an analog processor, Model SR235 and a computer interface, Model SR245. When a digital oscilloscope was used in place of the boxcar averager, it was a LeCroy, Model 9400, from LeCroy Corp., Spring Valley, N.Y.

Any suitable computer, such as a personal computer with a simple curve fitting program may be used for supplying data output. Alternatively, a dedicated unit such as a logarithmic amplifier could be adapted for data processing. Any miscellaneous optical elements such as lenses, prisms, mirrors, beam splitters, etc. are standard items available from optical supply houses.

Figure 3:
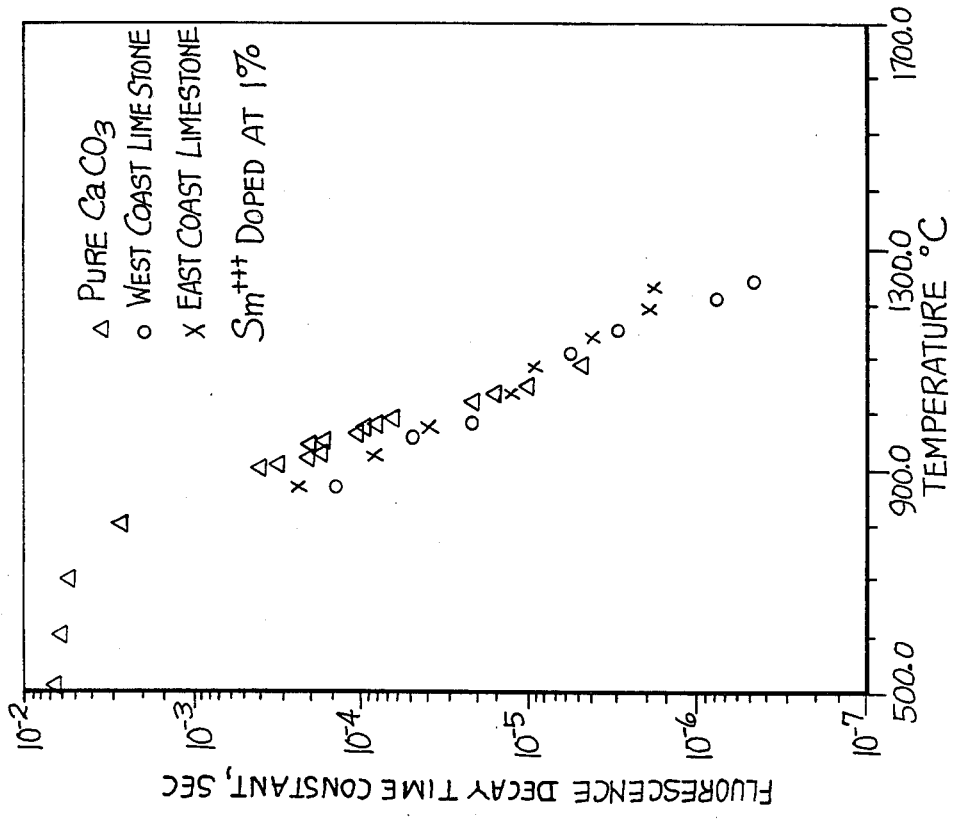
FIG. 3 is a plot comparing fluorescence lifetime versus temperature of one pure and two natural calcareous minerals.

In order to determine the sensitivity of the system to impurities, three samples of samarium doped calcium oxide were prepared, using 1% samarium on a molar basis. One lime sample was reagent grade calcium carbonate. Another was lime mud obtained from the chemical recovery system of a southeastern kraft pulp mill. The third sample was lime mud obtained from the chemical recovery system of a northwestern kraft pulp mill. These products were slurried in a solution of samarium sulfate which was then dried to distribute the dopant on the surface of the particles. The particles were the oven fired at 1100° C. for approximately 5 hours in a laboratory oven to form the respective phosphors. Each of the doped lime samples was then placed in a laboratory oven at temperatures varied between 500° and 1300° C. Hot samples were illuminated with the beam from the Nd:YAG laser and fluorescence lifetime recorded. Results are shown in FIG. 3. At this level of dopant, there appears to be a semilog-linear relationship between fluorescence lifetime and temperature in the range between 800° and about 1250° C. There was no evidence of interference or inaccuracy caused by impurities in the two natural lime products.

Figure 4:
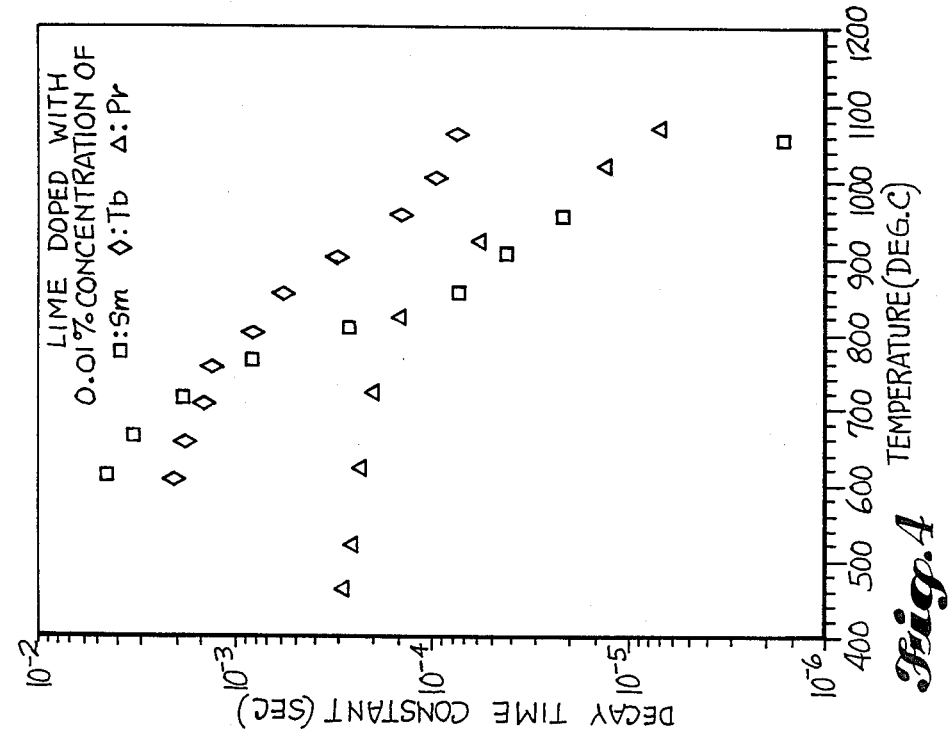
FIG. 4 is a plot showing decay time constant versus temperature of lime doped with three different rare earth metals.

One percent is a relatively high level of dopant use which would not always be economically practical in many systems, especially those where the product was not recycled to the kiln. Samples were prepared similar to those just described using reagent grade calcium carbonate with 0.01% molar concentration of samarium, terbium, and praseodymium. A comparison of the decay time constants plotted against temperature is seen in FIG. 4. Samarium appears to be useful at this concentration over a temperature range between approximately 700° and 1050° C. At higher temperatures decay time becomes too short to measure with great accuracy. Praseodymium is useful at this dopant level over the range of about 800° to at least 1100 C., where a semilog-linear relationship is shown between temperature and decay time. The linear portion of the curve for terbium appears somewhat narrower than the other two dopants and appears to fall between about 760 and 1000° C.

The curve shown in FIG. 4 indicates that at least three rare earth dopants are useful over most of the temperature range normally encountered within a lime kiln at concentrations low enough so that the cost is acceptable. Similar experiments have been made using europium, gadolinium and dysprosium as dopants with satisfactory results being obtained. At the present time for use in a lime kiln, praseodymium is a preferred dopant because of its extremely bright fluorescence and good linearity over the range from about 800° to at least 1100° C. Terbium has an even higher light output although its decay time constant is semilog-linear over a considerably narrower temperature range.

Figure 5:
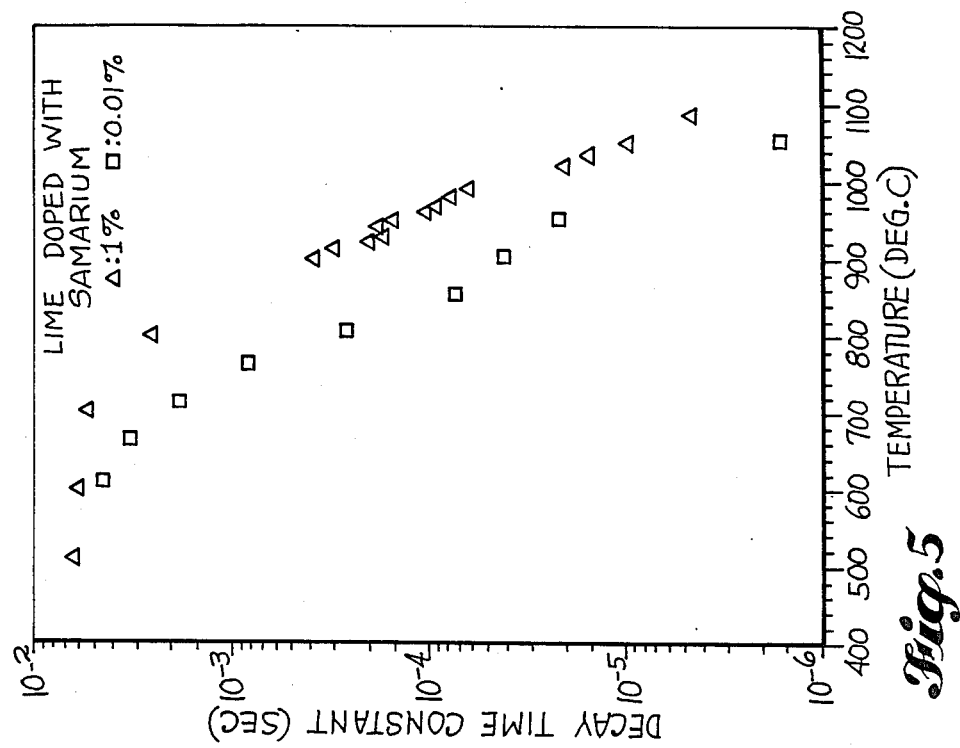
FIG. 5 is a plot showing decay time constant versus temperature for lime doped with samarium at two widely differing concentrations.

Some control over the concentration of dopant is required if satisfactory temperature readings are to be obtained. FIG. 5 show curves of decay time constant versus temperature for samarium doped lime using concentrations of 1 and 0.01 molar percent dopant. At any given decay time the two curves are displaced by approximately 100 C. This is not considered to be a serious problem since the level of dopant can be quite accurately controlled using standard weight feeding equipment to add the appropriate amount of dopant to make up limestone. It should be noted that the curves shown in FIG. 5 are for levels of dopant which are two full orders of magnitude apart. This level of variation would never occur within an industrial operation.

Other candidate rare earth materials which have been investigated include europium, gadolinium and dysprosium. Of these dysprosium is the most promising material, having a fluorescence output similar to samarium. Europium is less desirable since its fluorescence peaks are at longer wavelengths and are more subject to thermal background interference. Europium is also about ten times more expensive than the other rare earth materials of interest. Gadolinium is unique among the rare earths studied in that its fluorescence occurs in the ultraviolet region of the spectrum at 315 nm. This would suggest that it might be preferable over the other rare earths for some applications since thermal background interference would be negligible at the wavelength. In the host materials discussed here the fluorescence from gadolinium is relatively weak. However, in some applications the advantage of negligible background may outweigh the disadvantage of weak fluorescence.

Having this disclosed the best modes presently known to the inventor of practicing his invention, it will be apparent to those skilled in the art that many variations could be made in the described process without departing from the spirit of the invention. The invention is thus to be considered as limited only by the following claims.

I claim:

1. A method of measuring temperature of a hot mineral material which comprises:
    doping a calcareous mineral material containing $CaCO_3$ with a sufficient amount of a lanthanide group rare earth metal compound, in which the rare earth metal has an atomic number between 58 and 71;
    calcining the mineral material in a kiln at a sufficient temperature and for a sufficient time to convert at least a major part of the $CaCO_3$ into CaO and incorporate the rare earth metal into the crystal lattice of the CaO to form a phosphor;
    exciting the hot CaO-based phosphor with laser light energy while it is still within or as it is discharged from the kiln wherein the exciting wavelength is shorter than the wavelength of the major fluorescence peaks of the phosphor;
    measuring the fluorescence emitted by the excited hot phosphor and
    relating the measured fluorescence to the temperature of the material.

2. The method of claim 1 in which the laser light is pulsed to induce fluorescence and the decay time of the induced fluorescence is measured and related to temperature.

3. The method of claim 1 in which the fluorescence is measured at two wavelength peaks and the ratio of fluorescence intensity at the two wavelengths is related to temperature.

4. The method of claim 1 in which the mineral material calcined at a temperature of at least 800° C.

5. The method of claim 1 in which the calcareous mineral material also contains an argillaceous mineral.

6. The method of claim 1 in which the calcareous mineral is limestone and the calcined material is reconverted to $CaCO_3$ in a downstream process, the reconverted material being recycled to the calcining step without the further addition of calcareous mineral and rare earth compound other than that required to make up process losses.

7. The method of claim 6 in which the downstream process is the recausticizing of kraft pulping liquor.

8. The method of claim 1 in which the rear earth metal is selected from the group consisting of praseodymium, samarium, europium, gadolinium, terbium, and dysprosium.

9. The method of claim 1 in which the rare earth metal is present in an amount of at least 0.001 mol %.

10. The method of claim 1 in which the rare earth metal is present in an amount of at least 0.01 mol %.

11. The method of claim 1 in which the laser excitation wavelength is at a wavelength of about 355 nm.

12. The method of claim 1 in which the rare earth metal is selected from praseodymium, samarium, europium, terbium, and dysprosium, and the excitation is at the third harmonic wavelength of a neodymium doped YAG laser.

13. The method of claim 12 in which the rare earth, metal is praseodymium.

14. The method of claim 1 in which the rare earth metal is gadolinium and the excitation is at the fourth harmonic wavelength of a neodymium doped YAG laser.

* * * * *

UNITED STATES PATENT AND TRADEMARK OFFICE
CERTIFICATE OF CORRECTION

PATENT NO.   : 4,759,033
DATED        : July 19, 1988
INVENTOR(S)  : Peter C. Ariessohn It is certified that error appears in the above-identified patent and that said Letters Patent is hereby corrected as shown below:

In column 4, line 3, "Indiam" should read --Indian--;

in column 7, line 1, "use" should read --used--;

in column 7, line 51, "PR 140RF-" should read --PR 1405RF--;

in column 8, line 37, "1100 C" should read --1100° C--;

in column 8, line 41, "760" should read --760°--;

in column 8, line 61, "100 C" should read --100° C--;

in column 10, line 24, "rear" should read --rare --.

Signed and Sealed this

Twenty-fifth Day of April, 1989

*Attest:*

DONALD J. QUIGG

*Attesting Officer*   *Commissioner of Patents and Trademarks*